United States Patent
Kido et al.

(10) Patent No.: US 10,103,810 B2
(45) Date of Patent: Oct. 16, 2018

(54) SIGNBOARD APPARATUS AND SIGNBOARD SYSTEM

(71) Applicant: Panasonic Intellectual Property Management Co., Ltd., Osaka (JP)

(72) Inventors: Shojirou Kido, Osaka (JP); Yohei Hayashi, Osaka (JP)

(73) Assignee: PANASONIC INTELLECTUAL PROPERTY MANAGEMENT CO., LTD., Chuo-Ku, Osaka-Shi, Osaka (JP)

( * ) Notice: Subject to any disclaimer, the term of this patent is extended or adjusted under 35 U.S.C. 154(b) by 0 days.

(21) Appl. No.: 15/075,420

(22) Filed: Mar. 21, 2016

(65) Prior Publication Data

US 2016/0293069 A1    Oct. 6, 2016

(30) Foreign Application Priority Data

Apr. 3, 2015  (JP) ................................ 2015-077100

(51) Int. Cl.
| | |
|---|---|
| H04B 10/11 | (2013.01) |
| H04B 10/116 | (2013.01) |
| H05B 33/08 | (2006.01) |
| G09F 9/00 | (2006.01) |

(52) U.S. Cl.
CPC ............ H04B 10/116 (2013.01); G09F 9/00 (2013.01); H05B 33/0845 (2013.01); H05B 33/0854 (2013.01)

(58) Field of Classification Search
CPC ..................... H04B 10/116; G09G 2300/026
See application file for complete search history.

(56) References Cited

U.S. PATENT DOCUMENTS

| | | | | |
|---|---|---|---|---|
| 2013/0335592 | A1* | 12/2013 | Yamada ................. | H04B 10/11 348/229.1 |
| 2015/0016825 | A1 | 1/2015 | Haruyama et al. | |
| 2015/0098709 | A1* | 4/2015 | Breuer ..................... | G01C 3/08 398/118 |
| 2017/0104532 | A1* | 4/2017 | Stout .................... | H04B 10/116 |

FOREIGN PATENT DOCUMENTS

| | | |
|---|---|---|
| JP | 2006-279747 A | 10/2006 |
| JP | 2007-266794 A | 10/2007 |
| JP | 2008-235115 A | 10/2008 |
| JP | 2009-212768 A | 9/2009 |
| JP | 2015-019235 A | 1/2015 |

* cited by examiner

*Primary Examiner* — Liliana Cerullo
(74) *Attorney, Agent, or Firm* — Renner, Otto, Boisselle & Sklar, LLP

(57) ABSTRACT

A signboard apparatus includes: light panel apparatuses arranged two-dimensionally, and each having a transmission function and a light-emitting face for visible light communication; and a control apparatus that performs, with respect to the light panel apparatuses, exclusive control of the transmission function. The light panel apparatuses are arranged as a collective signboard.

15 Claims, 14 Drawing Sheets

SIGNBOARD APPARATUS AND SIGNBOARD SYSTEM

CROSS REFERENCE TO RELATED APPLICATION

This application claims the benefit of priority of Japanese Patent Application Number 2015-077100 filed on Apr. 3, 2015, the entire content of which is hereby incorporated by reference.

BACKGROUND

1. Technical Field

The present disclosure relates to a signboard apparatus and a signboard system.

2. Description of the Related Art

Japanese Unexamined Patent Application Publication No. 2007-266794 (Patent Literature 1 (PTL 1)) discloses a visible light communication system in which light apparatuses that execute visible light communication are controlled to execute visible light communication sequentially, so that, even if part of the light distribution areas of adjacent light apparatuses overlap, the adjacent light apparatuses do not execute visible light communication simultaneously. This prevents information interference during execution of visible light communication.

SUMMARY

For example, conventionally, in a collective signboard introducing plural shops (e.g., restaurants, stores, etc.), a single light source (backlight system) is shared, and thus it is not possible to select one of the plural shops and directly retrieve the information of that shop. In a system in which a different visible light communication optical signal is transmitted for each of plural panels, it becomes possible to directly retrieve shop information independently. For example, by spatially separating, on a panel basis, an image captured by a camera, information on a desired shop can be obtained.

However, when optical signals from plural panels enter the image-capturing area of the camera, the processing load for spatial separation increases. For example, when spatial separation is unsuccessful, there is the problem that retrying spatial separation causes the processing load to become heavy, and information reading speed becomes slow. Furthermore, there is the problem that, when erroneous spatial separation is performed, erroneous information is recognized.

The present disclosure provides a signboard apparatus and a signboard system that transmits different optical signals from adjacent light sources, reduces misrecognition of optical signals, and reduces deterioration of reading speed, that is, information recognition speed at the user-side.

A signboard apparatus according to an aspect of the present disclosure includes: a plurality of light panel apparatuses arranged two-dimensionally, and each having a transmission function and a light-emitting face for visible light communication; and a control apparatus that performs, with respect to the plurality of light panel apparatuses, exclusive control of the transmission function, wherein the plurality of light panel apparatuses are arranged as a collective signboard.

Furthermore, a signboard system according to an aspect of the present disclosure includes: the signboard apparatus; and a portable device that receives a signal for visible light communication from the signboard apparatus, wherein the portable device includes a camera that receives the signal for visible light communication.

According to the signboard apparatus according to the present disclosure, in the receiving of visible light communication, it is possible to reduce misrecognition and reduce deterioration of reading speed, that is, information recognition speed at the portable device-side.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, exemplary embodiments of the present disclosure shall be described in detail with reference to the drawings. It should be noted that each of the subsequently-described exemplary embodiments shows one specific example of the present disclosure. The numerical values, shapes, materials, structural components, the arrangement and connection of the structural components, etc. shown in the following exemplary embodiments are mere examples, and are not intended to limit the scope of the present disclosure. Furthermore, among the structural components in the following exemplary embodiments, components not recited in any one of the independent claims which indicate the broadest concepts of the present disclosure are described as arbitrary structural components.

Embodiment 1

A signboard apparatus and a signboard system according to Embodiment 1 are described below.

[1.1 Structure of Signboard Apparatus]

Figure 1:
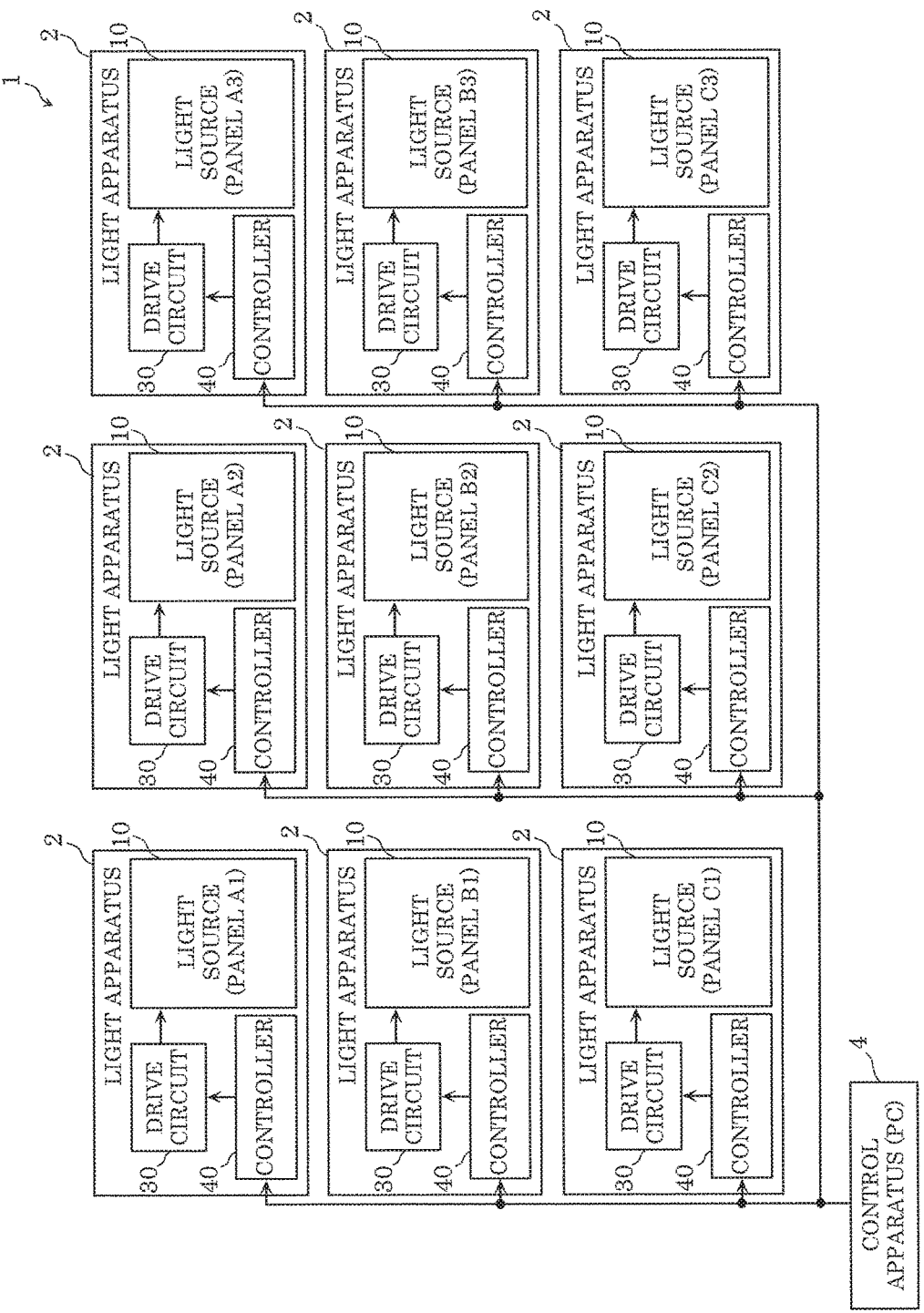
FIG. 1 is a block diagram illustrating an example configuration of a signboard apparatus according to Embodiment 1.

FIG. 1 is a block diagram illustrating an example configuration of signboard apparatus 1 according to Embodiment 1. As illustrated in FIG. 1, signboard apparatus 1 includes plural light apparatuses 2, and control apparatus 4.

Each of light apparatuses 2 is a light panel apparatus having a transmission function and a light-emitting face which are for visible light communication (VLC). Light apparatuses 2 are two-dimensionally arranged as a collective signboard.

Control apparatus 4 is, for example, a personal computer (PC), and is connected to light apparatuses 2 via communication lines. Control apparatus 4 controls the dimming and visible light communication of signboard apparatus 1 by transmitting various types of commands to signboard apparatus 1 via the communication lines. The various types of commands include, for example, a command instructing a dimming level and a command instructing the execution of visible light communication. It should be noted that communication between control apparatus 4 and light apparatuses 2 may be implemented by wired communication or wireless communication. Furthermore, control apparatus 4 performs exclusive control of the visible light communication transmission function of light apparatuses 2.

The aforementioned exclusive control, for example, includes at least one of (A) to (C) below.

(A) Control apparatus 4 causes each of light apparatuses 2 to execute the transmission function exclusively of a horizontally adjacent light apparatus 2. In this case, control apparatus 4 may allow each of light apparatuses 2 to execute the transmission function simultaneously with an obliquely adjacent light apparatus 2.

(B) Control apparatus 4 causes each of light apparatuses 2 to execute the transmission function exclusively of a vertically adjacent light apparatus 2. In this case, control apparatus 4 may allow each of light apparatuses 2 to execute the transmission function simultaneously with an obliquely adjacent light apparatus 2.

(C) Control apparatus 4 causes each of light apparatuses 2 to execute the transmission function exclusively of a light apparatus 2 which is adjacent in a predetermined direction, and allows each of light apparatuses 2 to execute the transmission function simultaneously with a light apparatus 2 which is adjacent in a direction other than the predetermined direction. The predetermined direction is any one of the horizontal, vertical, and oblique directions, and it is sufficient to arbitrarily specify a direction in which the greatest number of adjacent light apparatuses 2 is present.

Such an exclusive control reduces misrecognition of optical signals from adjacent light apparatuses 2, and reduces deterioration of reading speed, that is, information recognition speed at the portable device-side.

In FIG. 1, each of light apparatuses 2 includes light source 10, drive circuit 30, and controller 40. It should be noted that light apparatuses 2 in the figure are referred to as panel A1, A2, . . . , C3 when distinguishing one from the other.

Light source 10 is a panel-shaped light-emitting body. Light source 10 includes, for example, a tabular transparent resin board and plural light-emitting diodes (LEDs). The LEDs introduce light from the back or side of the transparent resin board so that light is emitted from the entire front face (outer surface) of the transparent resin board. A guide for a shop, for example, is depicted on the front face of the transparent resin board as a signboard. It should be noted that light source 10 is not limited to a combination of the transparent resin board and plural LEDs, and may be an organic electroluminescent (EL) panel as long as it is a light-emitting body capable of visible light communication.

Drive circuit 30 supplies a constant current of a value corresponding to the dimming level of light source 10, according to an instruction (analog dimming signal) from controller 40, and executes pulse modulation as a visible light communication transmission function, according to an instruction (pulse modulation signal) from controller 40. The pulse modulation may be, for example, the 4-value pulse position modulation (4PPM) defined in the "Visible Light ID System" (CP-1222) standard of the Japan Electronics and Information Technology Industries Association (JEITA). In 4PPM, for example, one symbol time is 0.416 ms and one slot time is 0.104 ms. Since one symbol is represented by two bits, the bit rate is 4.8 kbps. In order to increase lighting time percentage, the pulse modulation according to this embodiment may be the I4PPM (inverted 4-value pulse position modulation) obtained by inverting the 4PPM.

Controller 40 is a microcomputer, and transmits an analog dimming signal and a pulse modulation signal to drive circuit 30 according to a command from control apparatus 4. An analog dimming signal is a signal for indicating the dimming level and the magnitude of the constant current. A pulse modulation signal is a signal the above-described I4PPM. Pulse modulation is executed in an interval instructed in a command from control apparatus 4. An interval in which pulse modulation is executed is called a modulation interval, and an interval in which pulse modulation is not executed is called a pause interval. Furthermore, controller 40 causes drive circuit 30 to repeat the modulation interval and the pause interval, according to a command from control apparatus 4. The modulation intervals are controlled by control apparatus 4 according to any one of above-described (A) to (C) so that the modulation intervals of adjacent light apparatuses 2 do not overlap.

[1.2 Structure of Signboard System]

Next, a structure of a signboard system according to this embodiment will be described.

Figure 2:
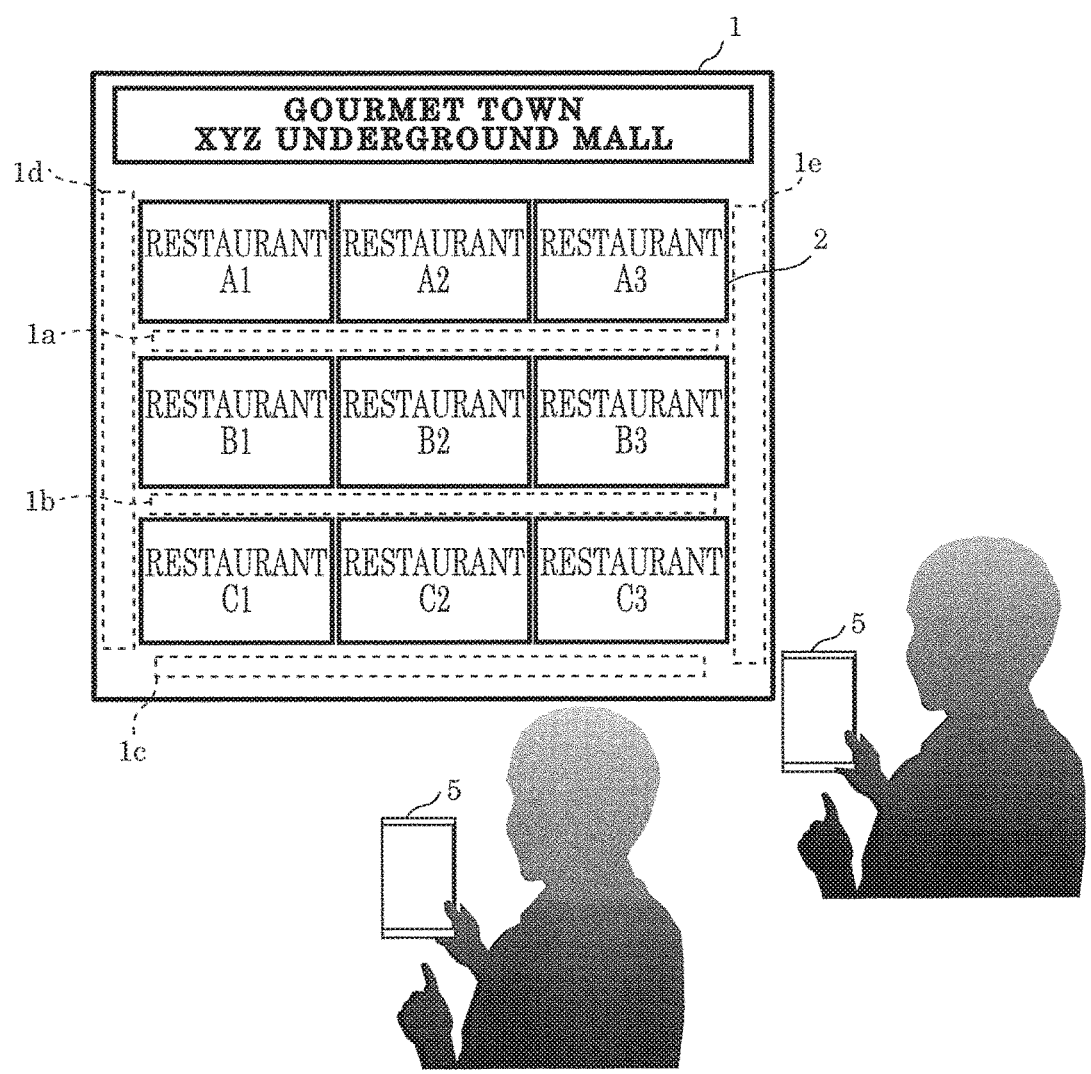
FIG. 2 is an external view of an example of a signboard system according to Embodiment 1.

FIG. 2 is an external view of an example of a signboard system according to Embodiment 1. As illustrated in FIG. 2, the signboard system includes signboard apparatus 1 and plural portable devices 5.

Although the light-emitting faces of respective light apparatuses 2 are arranged in a matrix of 3 rows by 3 columns in FIG. 2, the arrangement is not limited to a matrix. For example, the arrangement may be in a shape, size, and positioning matching a floor layout. Furthermore, the sizes of the respective light-emitting faces need not be the same.

Each of portable devices 5 is, for example, a smartphone or tablet terminal device, and has a camera through which visible light communication is received.

Furthermore, signboard apparatus 1 in FIG. 2 includes, on the front face of the layout of light apparatuses 2 (light panel apparatuses), invitation displays (e.g., 1a to 1e) having an icon or a guidance message inviting the receiving of visible light communication. Each of invitation displays 1a to 1e includes, for example, icons or invitation messages such as "Visible light communication ongoing; detailed attached information receivable by smartphone.", "Please activate app and point camera toward desired restaurant signboard.", "Hold smartphone upright and take a photo of a restaurant signboard to view suggested menu.", "Hold smartphone sideways and hold camera up to a restaurant signboard", "Visible light communication-capable.", and so on. Accordingly, a user of portable device 5 can obtain, as detailed restaurant information, for example, a uniform resource locator (URL) of the restaurant, an image of the restaurant interior, a recommended menu, prices, available seating, waiting time, a discount coupon, etc.

As in the case of invitation displays 1a to 1c, plural invitation displays may be placed at approximately equal intervals, between light-emitting faces.

[1.3 Example of Exclusive Control by Control Apparatus 4]

Next, an example of exclusive control of transmission functions performed with respect to light apparatuses 2 by control apparatus 4 will be described.

Figure 3:
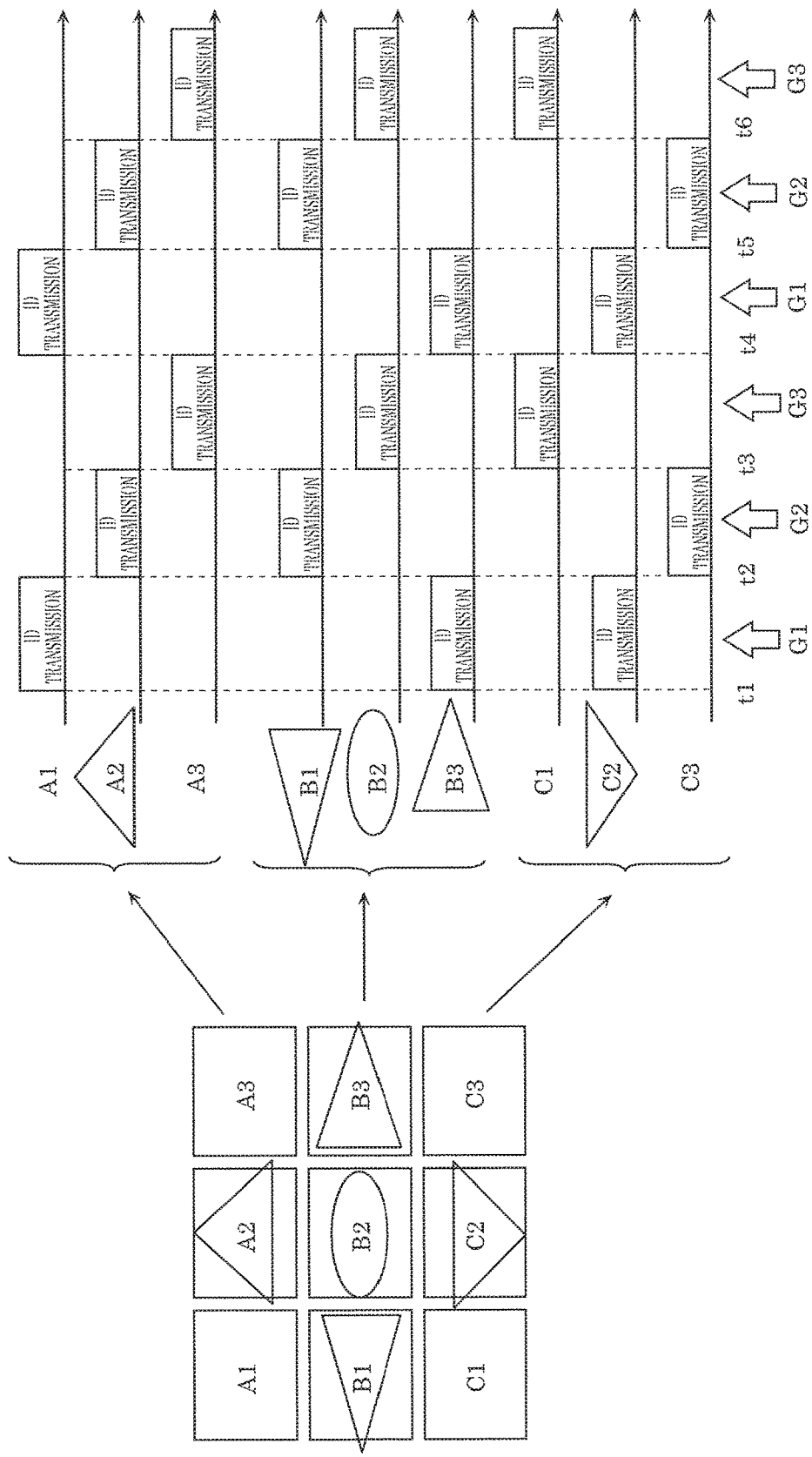
FIG. 3 is a time chart illustrating an example of exclusive control by a signboard apparatus according to Embodiment 1.

FIG. 3 is a time chart illustrating an example of exclusive control by signboard apparatus 1 according to Embodiment 1. The arrangement of light apparatuses 2 in FIG. 1 and FIG. 2 (denoted here as panels A1 to A3, B1 to B3, and C1 to C3) is illustrated on the left side of FIG. 3. Time charts depicting the modulation intervals (the "ID transmission" intervals in the figure) for each panel are illustrated on the right side of FIG. 3.

Controller 4 classifies panels into groups and stores the classification. In the figure, group G1 is composed of panels A1, B3, and C2. Group G2 is composed of panels A2, B1, and C3. Group G3 is composed of panels A3, B2, and C1. This grouping satisfies aforementioned (A) and (B). Specifically, the grouping into groups G1 to G3 is carried out so that each of the panels executes the transmission function exclusively of a vertically or horizontally adjacent panel.

At time t1, control apparatus 4 transmits a command instructing the start of modulation, to panels A1, B3, and C2 belonging to group G1. Accordingly, panels A1, B3, and C2 transition from the pause interval to the modulation interval. In this modulation interval, the other panels that are vertically or horizontally adjacent to each of panels A1, B3, and C2 are in the pause interval. Subsequently, each of panels A1, B3, and C2 transition from the modulation interval to the pause interval after a fixed time elapses. The fixed time is a time less than or equal to t2−t1.

In addition, at time t2, control apparatus 4 transmits a command instructing the start of modulation, to panels A2, B1, and C3 belonging to group G2. Accordingly, panels A2, B1, and C3 transition from the pause interval to the modulation interval. In this modulation interval, the other panels that are vertically or horizontally adjacent to each of panels A2, B1, and C3 are in the pause interval. Subsequently, each of panels A2, B1, and C3 transition from the modulation interval to the pause interval after the fixed time elapses.

In addition, at time t3, control apparatus 4 transmits a command instructing the start of modulation, to panels A3, B2, and C1 belonging to group G3. Accordingly, panels A3, B2, and C1 transition from the pause interval to the modulation interval. In this modulation interval, the other panels that are vertically or horizontally adjacent to each of panels A3, B2, and C1 are in the pause interval. Subsequently, each of panels A3, B2, and C1 transition from the modulation interval to the pause interval, after the fixed time elapses.

From time t4 onward, control apparatus 4 repeats the command transmission in times t1 to t3 in the same manner.

In this manner, control apparatus 4 can easily implement exclusive control by merely storing groups corresponding to the exclusive control, and transmitting a command instructing the start of a modulation interval, to each of the groups.

It should be noted that the transition from the modulation interval to the pause interval may be triggered by a command from control apparatus 4 instead of the elapse of a fixed time. Furthermore, the length of the modulation interval for the respective groups need not be the same, and may be different for each of the groups.

[1.4 Another Example of Exclusive Control by Control Apparatus 4]

Next, another example of exclusive control of transmission functions performed on light apparatuses 2 by control apparatus 4 will be described.

Figure 4:
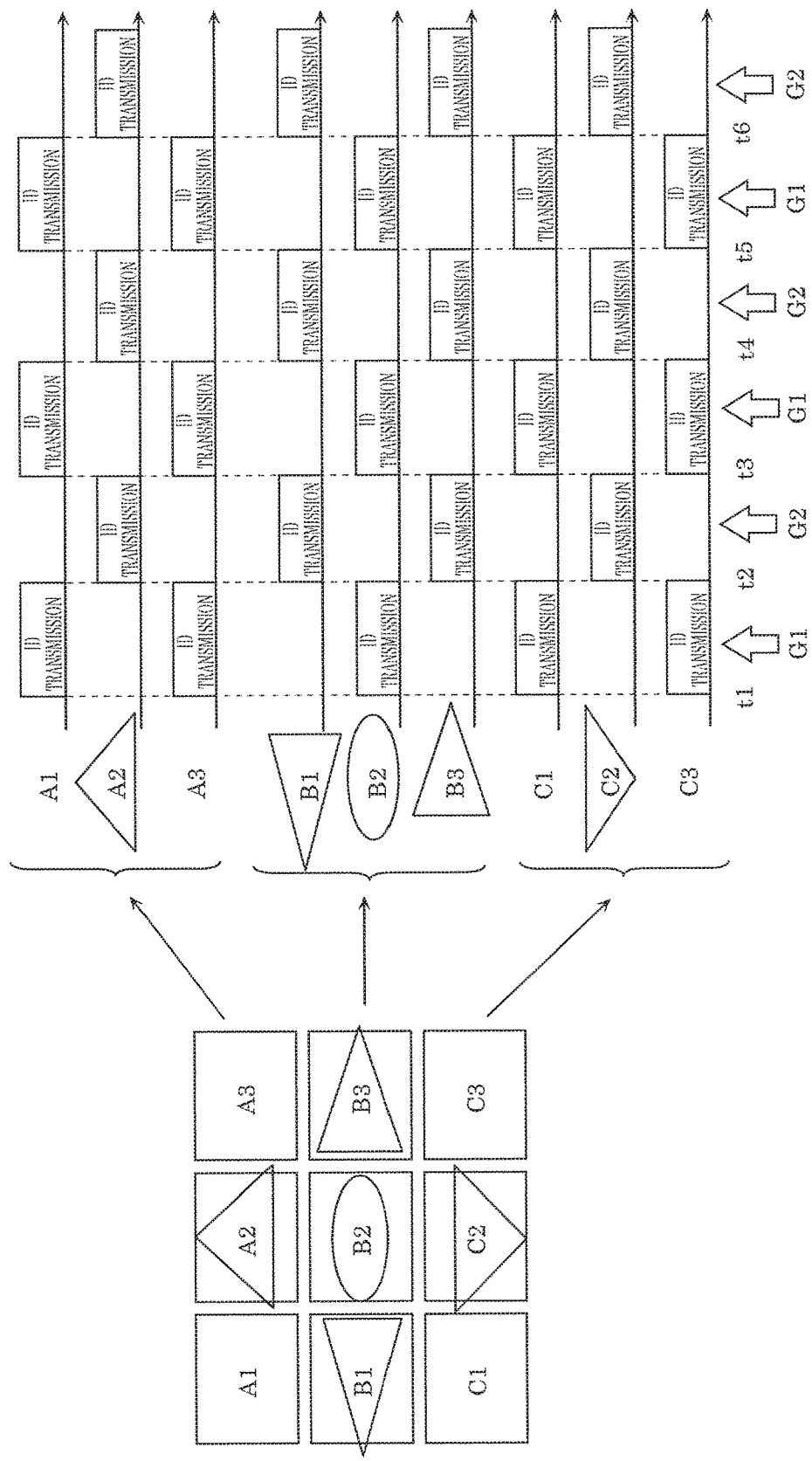
FIG. 4 is a time chart illustrating another example of exclusive control of a signboard apparatus according to Embodiment 1.

FIG. 4 is a time chart illustrating another example of exclusive control by signboard apparatus 1 according to Embodiment 1. Compared to FIG. 3, FIG. 4 is different in terms of separation into two groups instead of three. Hereinafter, description will be carried out focusing on the points of difference.

Group G1 is composed of panels A1, A3, B2, C1 and C3. Group G2 is composed of panels A2, B1, B3, and C2. This grouping also satisfies aforementioned (A) and (B). Specifically, the grouping into groups G1 and G2 is carried out so that each of the panels executes the transmission function exclusively of a vertically or horizontally adjacent panel.

At time t1, t3, t5, . . . , control apparatus 4 transmits a command instructing the start of modulation, to each of the panels belonging to group G1. Subsequently, each of these panels transition from the modulation interval to the pause interval after the fixed time elapses.

At time t2, t4, t6, . . . , control apparatus 4 transmits a command instructing the start of modulation, to each of the panels belonging to group G2. Subsequently, each of these panels transition from the modulation interval to the pause interval after the fixed time elapses.

In FIG. 3, there is a 1:2 ratio between modulation intervals and pause intervals for each panel, whereas, in FIG. 4, there is a 1:1 ratio between modulation intervals and pause intervals. In other words, in FIG. 4, the time for which visible light communication is executed by the respective panels increases.

[1.5 Example of Receiving by Portable Device 5]

Next, an example of visible light signal receiving by portable device 5 will be described. The receiving of visible light communication can be performed using a single light-receiving element such as a photodiode, or an image sensor of a camera. Here, description is carried out for the case of receiving visible light communication using portable device 5 which includes, as a camera, a MOS image sensor used in a typical smartphone.

Figure 5:
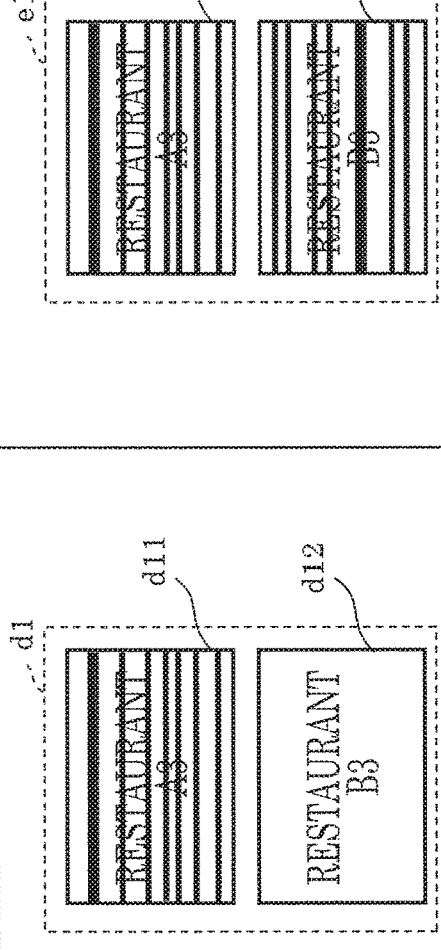
FIG. 5 is an explanatory diagram illustrating an example of a portable device and captured images.

FIG. 5 is an explanatory diagram illustrating an example of portable device 5 and captured images. In the figure, "portable device orientation" indicates the case of landscape shooting in which portable device 5 is held in the landscape orientation (i.e., the lengthwise direction of portable device 5 is oriented in the horizontal direction) during camera image-capturing, and the case of portrait shooting in which portable device 5 is held in the portrait orientation (i.e., the lengthwise direction is oriented in the vertical direction). Typically, an MOS image sensor includes a large number of pixels arranged in a matrix, and pixel signals are read on a pixel row basis (i.e., in horizontal line units). As such, a 1-frame image is not an image in which all pixels are taken at the same time, and the image-capturing time differs by 1 horizontal scanning period between adjacent horizontal line units. In "landscape shooting", the horizontal line of the image sensor is also in the landscape (horizontal) orientation. In the "portrait shooting", the horizontal line of the image sensor is also in the portrait (vertical) orientation.

In the figure, "with exclusive control" represents a captured image of signboard apparatus 1 in the case where the exclusive control according to this embodiment is executed, and "without exclusive control" represents a captured image in the case where the exclusive control is not executed.

First, images under "with exclusive control" will be described.

Image d1 surrounded by a broken line schematically represents an image obtained by cutting out a portion (the portion of panels A3 and B3) of an image of signboard apparatus 1 executing exclusive control, which is captured by landscape shooting using portable device 5.

Partial image d11 corresponding to panel A3 in image d1 is in the modulation interval, that is, an optical signal for visible light communication is being transmitted, during image-capturing. In partial image d11, barcode-like bright horizontal bands and dark horizontal bands appear. Since the reading time is different for each horizontal line, the time-sequential brightness and darkness of the panel caused by pulse modulation appear as horizontal bands. The dark horizontal bands represent inverted pulses of I4PPM. Portable device 5 identifies (spatially separates), in the captured image, a partial image in which dark horizontal bands appear, and I4PPM demodulation, that is, reading of data, is made possible by distinguishing the positions of the dark horizontal bands.

In contrast, partial image d12 corresponding to panel B3 in image d1 is in the pause interval due to exclusive control, and is thus lighted at any horizontal line reading time.

Furthermore, image d2 surrounded by a broken line schematically represents an image obtained by cutting out a portion (the portion of panels A2 and A3) of an image of signboard apparatus 1 executing exclusive control, which is captured by portrait shooting using portable device 5. Partial image d21 corresponding to panel A2 is in the pause interval, and thus dark vertical bands do not appear. Partial image d22 corresponding to panel A3 is in the modulation interval, and thus dark vertical bands appear.

Next, images under "without exclusive control" will be described.

Image e1 surrounded by a broken line schematically represents an image obtained by cutting out a portion (the portion of panels A3 and B3) of an image of a signboard apparatus that does not execute exclusive control, which is captured by landscape shooting using portable device 5.

Partial image e11 corresponding to panel A3 and partial image e12 corresponding to panel B3 in image e1 are in the modulation interval, that is, optical signals for visible light communication are being transmitted, during image-capturing. In partial image e11 and partial image e12, barcode-like bright horizontal bands and dark horizontal bands appear. Portable device 5 identifies (spatially separates), in the captured image, a partial image in which dark horizontal bands appear, and I4PPM demodulation, that is, reading of data, is made possible by distinguishing the positions of the dark horizontal bands. Incidentally, because the dark band pattern exists across panel A3 to panel B3 as in image e1, there are instances where the portion including panel A3 and panel B3 are erroneously spatially-separated, as one panel. In this case, even if demodulation of I4PPM is performed by distinguishing the positions of the dark horizontal bands, an error occurs or wrong data may be retrieved. Furthermore, there is also the possibility that each of panel A3 and panel B3 can be correctly separated when spatial separation is retried due to the occurrence of the error. However, even if the retry is successful, processing time up to when data is extracted becomes long. Furthermore, since modulation is performed for two panels, processing load increases twofold or more. As a result, the response speed, from image-capturing to data retrieval, deteriorates. The shorter the inter-panel distance is, the more difficult spatial separation becomes.

Furthermore, image e2 surrounded by a broken line schematically represents an image obtained by cutting out a portion (the portion of panels A2 and A3) of an image of a signboard apparatus that does not execute exclusive control, which is captured by portrait shooting using portable device 5.

Partial image e21 corresponding to panel A2 and partial image e22 corresponding to panel A3 in image e2 are in the modulation interval, that is, optical signals for visible light communication are being transmitted, during image-capturing. In partial image e21 and partial image e22, barcode-like bright vertical bands and dark vertical bands appear. As in above-described image e1, correct spatial separation is difficult, and thus wrong data may be retrieved. Furthermore, even if a retry after the occurrence of an error is successful, the response speed from image-capturing to data retrieval deteriorates.

In this manner, the exclusive control by control apparatus 4 facilitates the spatial separation of an image portion corresponding to a panel, performed with respect to an image captured by the camera of portable device 5. As a result, deterioration of the response speed from image-capturing to data retrieval can be reduced.

It should be noted that the receiving of visible light communication need not be performed using a camera, and is possible even with a light-receiving element such as a photodiode. For example, the closer portable device 5 having a built-in photodiode is held to a panel (for example, within a few centimeters), the easier receiving becomes.

[1.6 Configuration of Light Apparatus 2 (Light Panel Apparatus)]

Next the structure of light apparatus 2 as a light panel apparatus will be described.

Figure 6:
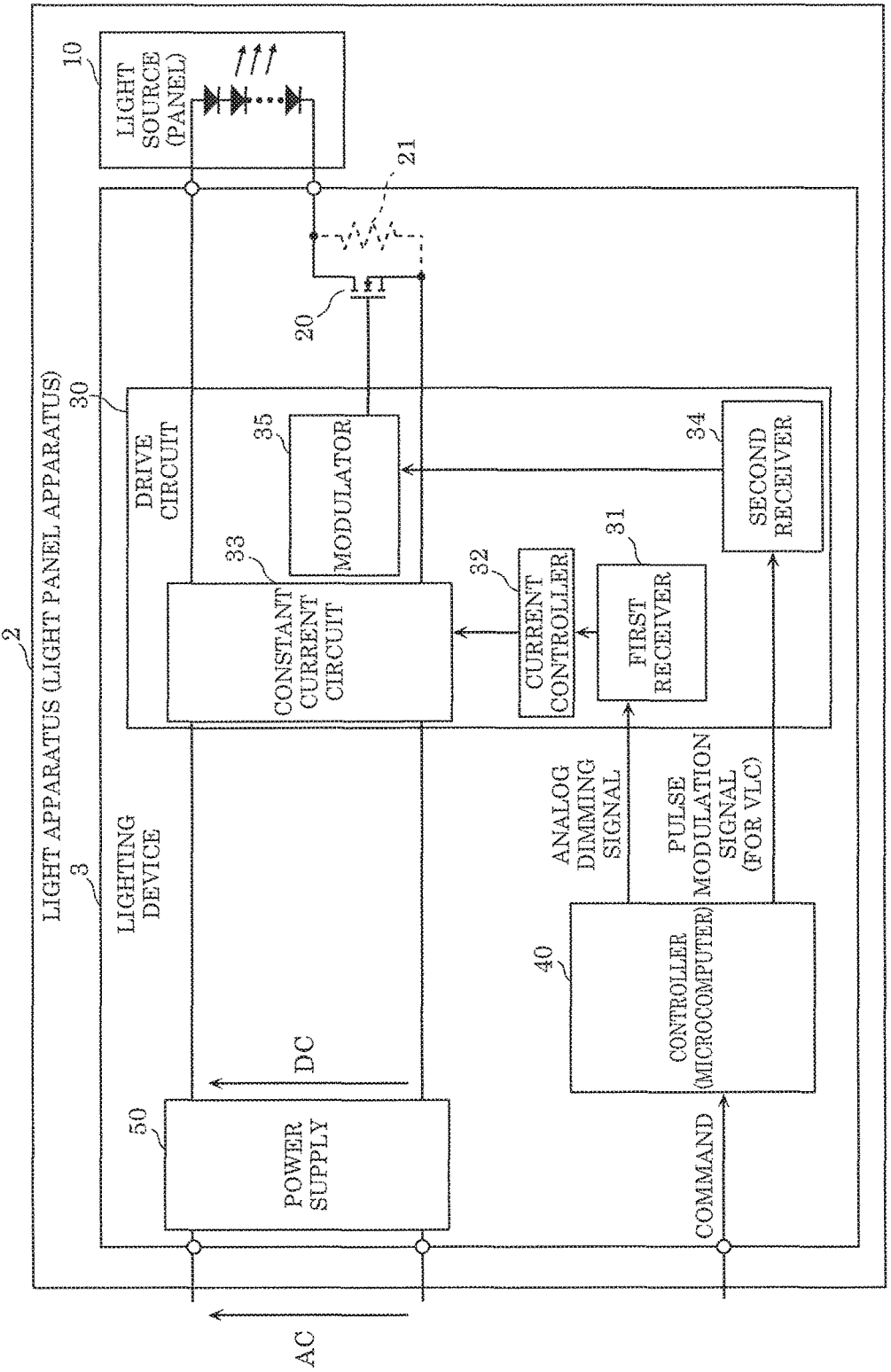
FIG. 6 is a block diagram illustrating a more detailed example configuration of the light apparatus according to Embodiment 1.

FIG. 6 is a block diagram illustrating a more detailed example configuration of light apparatus 2 according to Embodiment 1. As illustrated in the figure, light apparatus 2 includes light source 10 and lighting device 3.

Light source 10 is, as already described, a panel-shaped light-emitting body,

Lighting device 3 includes switch 20, resistor 21, drive circuit 30, controller 40, and power supply 50.

Switch 20 switches ON and OFF the current e supplied to light source 10 from drive circuit 30. The ON and OFF switching pulse-modulates the visible light from light source 10. This pulse modulation is, for example, the above-described I4PPM.

Resistor 21 is connected in parallel with switch 20, and connected in series with light source 10. Resistor 21 can pass current to light source 10 when switch 20 is OFF. In the aforementioned pulse modulation, light source 10 is switched rapidly between the two states of "dark light-emission" and "bright light-emission", in accordance with the switching ON and OFF of switch 20. The level of the "dark light-emission" can be determined according to the resistance of resistor 21. When visible light is to be 100% modulated (i.e., when "dark light-emission" is replaced with "no light-emission"), resistor 21 need not be included, and thus is illustrated in phantom as optional. It should be noted that an LED may be included in place of resistor 21.

Drive circuit 30 includes first receiver 31, current controller 32, constant current circuit 33, second receiver 34, and modulator 35.

First receiver 31 receives the analog dimming signal from controller 40, and instructs the dimming level to current controller 32.

Current controller 32 instructs, to constant current circuit 33, the magnitude of the constant current that constant current circuit 33 is required to supply to light source 10, according to the dimming level instructed by first receiver 31.

Constant current circuit 33 supplies light source 10 with constant current of the magnitude instructed by current controller 32.

Second receiver 34 receives the pulse modulation signal for visible light communication from controller 40, converts the level of the pulse modulation signal, and outputs the result to modulator 35.

Modulator 35 outputs to switch 20 a gate control signal which causes switch 20 to switch ON and OFF, according to the pulse modulation signal from second receiver 34.

Controller 40, as already described, generates and outputs, to drive circuit 30, an analog dimming signal and a pulse modulation signal, according to a command from control apparatus 4.

Power supply 50 is an alternating current-to-direct current (AC-DC) converter and includes a power factor correction (PFC) circuit and a harmonic reduction circuit.

Next, the current supplied to light source 10 in the pause interval and the modulation interval will be described.

Figure 7:
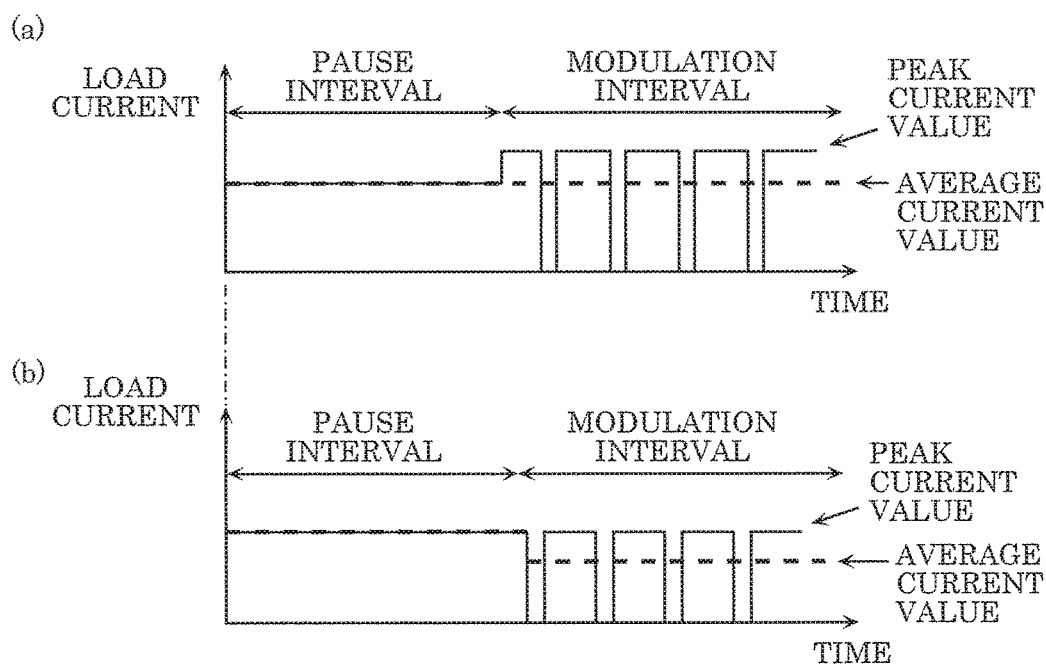
FIG. 7 illustrates time charts for examples of current waveforms of a light source in the pause interval and the modulation interval according to Embodiment 1.

FIG. 7 illustrates time charts for examples of current waveforms of light source 10 in the pause interval and the modulation interval according to Embodiment 1. In FIG. 7, (a) is a time chart for the case where the average current value in the modulation interval is matched with the current value in the pause interval. In FIG. 7, (b) is a time chart for the case where the average current value in the modulation interval is not matched with the current value in the pause interval.

As in (a) and (b) in FIG. 7, pulse modulation for visible light communication is not executed in the pause interval. In the pause interval, constant current is supplied from constant current circuit 33 to light source 10. The magnitude of the constant current can be changed by controller 40, first receiver 31, and current controller 32, according to a command instructing the dimming level from control apparatus 4.

As in (a) and (b) in FIG. 7, pulse modulation is executed in the modulation interval. The pulse modulation is executed through the switching ON and OFF of switch 20 according to the pulse modulation signal from controller 40.

In (a) in FIG. 7, the peak current value is increased in order to match the average current value in the modulation interval with the current value in the pause interval. This is implemented by controller 40 outputting an analog dimming signal at the start of the pulse modulation interval to change the dimming level to a value obtained by dividing the dimming level in the pause interval by the duty in the modulation interval. By doing so, the average brightness in the pause interval and the modulation interval are made the same even when the cycles of the pause interval and the modulation interval are long or when the modulation is deep (100% modulation, etc.), and thus visual flickering can be suppressed.

On the other hand, in (b) in FIG. 7, the peak current value in the modulation interval is the same as the average current value in the pause interval. As such, there are instances where the difference in brightness between the pause interval and the modulation interval is conspicuous in the form of visual flickering. In order to reduce flickering, it is sufficient to raise the frequency of the repetition of the pause interval and the modulation interval. For example, when the frequency is greater than or equal to 60 Hz, visual flickering can be suppressed. It should be noted that the frequency may be deliberately lowered (for example, less than or equal to 30 Hz). Accordingly, by causing visual flickering to occur, the panel that is executing visible light communication within signboard apparatus 1 can be specified.

[2.1 Operation of Signboard Apparatus 1]

The operation of signboard apparatus 1 configured in the manner described above will be described.

Figure 8:
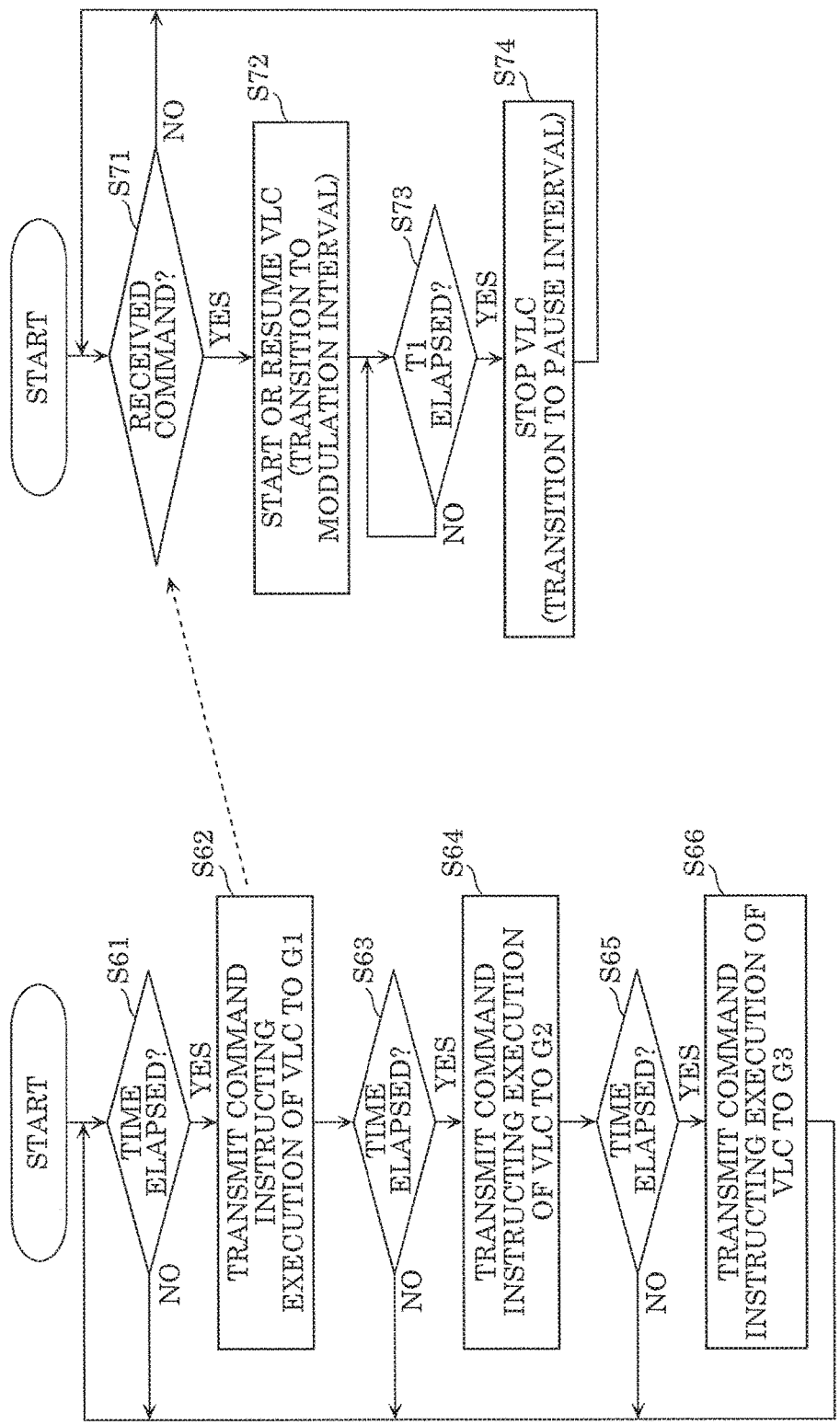
FIG. 8 is a flowchart illustrating an example process by a control apparatus and light apparatuses according to Embodiment 1.

FIG. 8 is a flowchart illustrating an example process by control apparatus 4 and light apparatuses 2 according to Embodiment 1. The flowchart in the figure corresponds to the exclusive control performed on the three groups, G1 to G3, illustrated in FIG. 3. Control apparatus 4 stores in advance the addresses of the panels (light apparatuses 2) belonging to each of groups G1, G2, and G3 in FIG. 3.

First, the operation of control apparatus 4 will be described.

Control apparatus 4 is assumed to measure (the time of) times t1 to t6, . . . illustrated in FIG. 3 as fixed intervals. First, when a fixed time elapses (YES in S61), control apparatus 4 transmits a command instructing execution of visible light communication (VLC) to the addresses of the panels belonging to group G1 (S62). This command instructs the start of the modulation interval to the panels.

In addition, when the fixed time elapses (YES in S63), control apparatus 4 transmits a command instructing execution of visible light communication (VLC) to the addresses of the panels belonging to group G2.

In addition, when the fixed time elapses (YES in S65), control apparatus 4 transmits a command instructing execution of visible light communication (VLC) to the addresses of the panels belonging to group G3.

By repeating steps S61 to S66, control apparatus 4 instructs execution of visible light communication to each of the exclusively classified groups, in each of times t1, t2, . . . illustrated in FIG. 3.

Next, the operation of panels (light apparatuses 2) will be described.

Each of the panels that has received the command instructing the execution of visible light communication from control apparatus 4 (YES in S71), starts or resumes visible light communication, that is, transitions from the pause interval to the modulation interval (S72). In addition, when time T1, which is the length of the modulation interval, elapses (YES in S73), each of the panels stops the visible light communication, that is, transitions from the modulation interval to the pause interval (S74). With this, each panel executes visible light communication only in the period of time T1 from when the command is received, as the modulation interval, and does not execute visible light communication in a period other than the modulation interval, as the pause interval.

In this manner, the exclusive control by control apparatus 1 facilitates the spatial separation of an image portion corresponding to a panel, performed with respect to an image captured by a camera of portable device 5. As a result, deterioration of the response speed from image-capturing to data retrieval can be reduced.

It should be noted that, when performing exclusive control on the two groups, G1 and G2, illustrated in FIG. 4, it is sufficient that control apparatus 4 stores in advance the addresses of the panels belonging to groups G1 and G2, and repeatedly performs steps S61 to S64 in FIG. 8.

[3.1 A Different Example of Exclusive Control]

Next, another example of exclusive control will be described.

Figure 9:
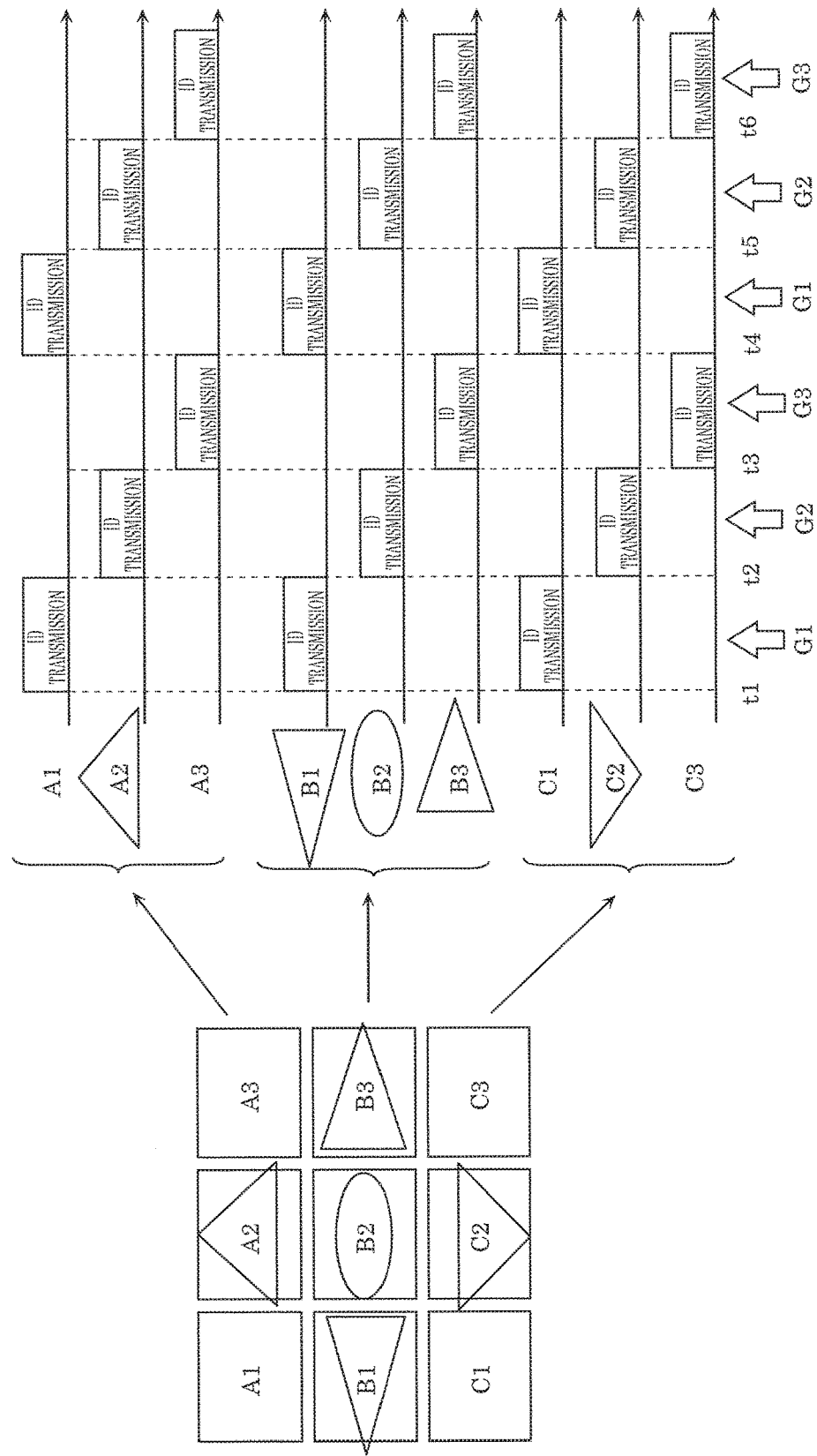
FIG. 9 is a time chart illustrating another example of exclusive control by the signboard apparatus according to Embodiment 1

FIG. 9 is a time chart illustrating another example of exclusive control by signboard apparatus 1 according to Embodiment 1. FIG. 3 and FIG. 4 describe examples of exclusive control that satisfies both aforementioned (A) and (B). FIG. 9 illustrates an example of exclusive control that satisfies (A) and does not satisfy (B) described above. In FIG. 9, group G1 is composed of panels A1, B1, and C1. Group G2 is composed of panels A2, B2, and C2. Group G3 is composed of panels A3, B3, and C3. Each of the panels executes the transmission function exclusively of a horizontally adjacent panel, and executes the transmission function simultaneously with a vertically adjacent panel. In other words, aforementioned (A) is satisfied.

The exclusive control in FIG. 9 is suitable for the portrait shooting illustrated in FIG. 6. In this case, for example, an icon or a sentence introducing "portrait shooting" may be displayed in at least one of invitation displays 1a to 1e illustrated in FIG. 2. By doing so, portable device 5 can, with respect to signboard apparatus 1 in which the exclusive control in FIG. 9 is executed, reduce misrecognition when receiving visible light communication, and reduce deterioration of reading speed, that is, information recognition speed at the portable device-side.

It should be noted that, in FIG. 9, groups G1 and G3 may be set as one new group, and the two groups, the new group and group G2, may alternately transition to the modulation interval.

Figure 10:
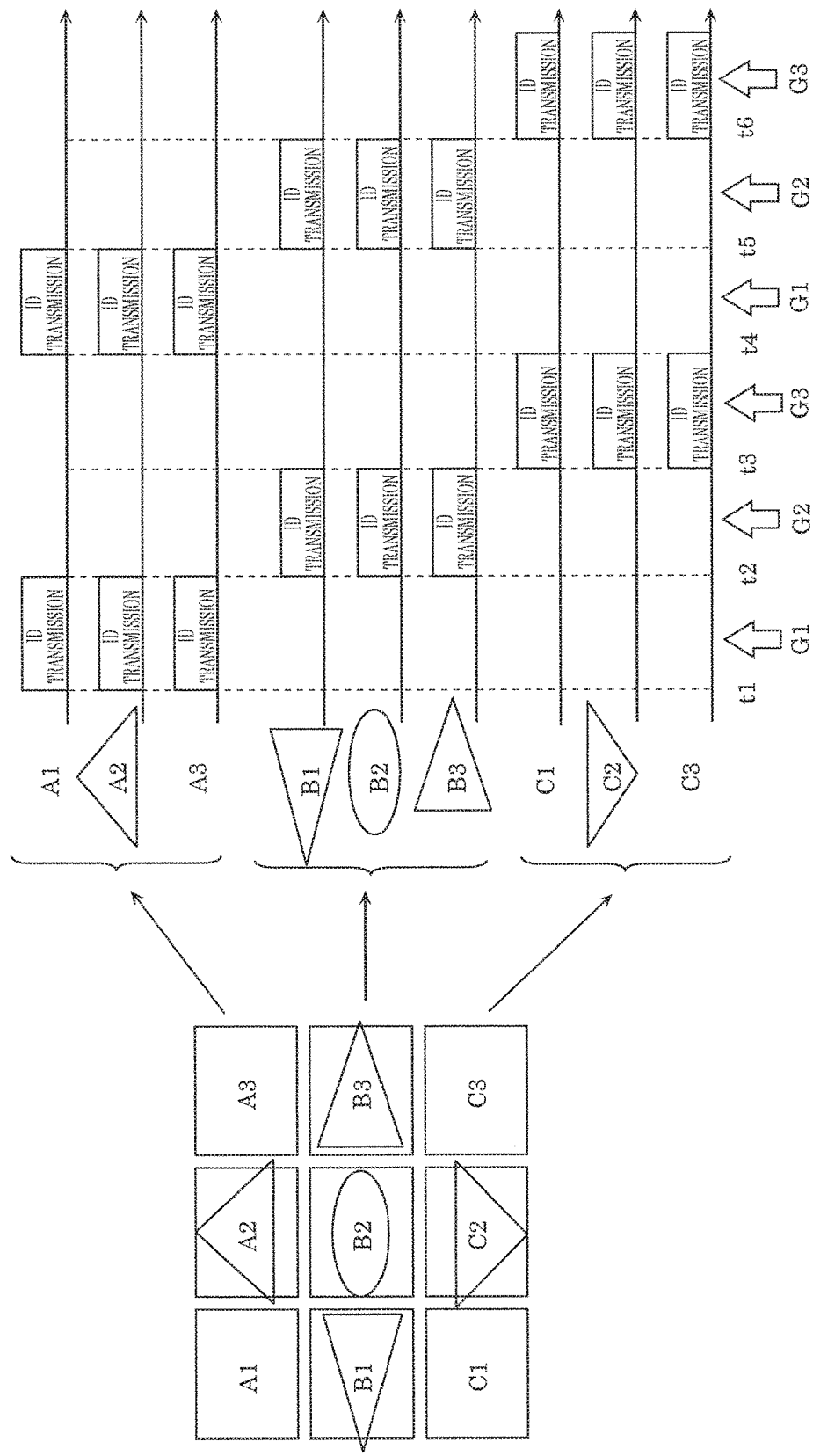
FIG. 10 is a time chart illustrating yet another example of exclusive control by the signboard apparatus according to Embodiment 1.

Furthermore, FIG. 10 is a time chart illustrating yet another example of exclusive control by signboard apparatus 1 according to Embodiment 1. FIG. 10 illustrates an example of exclusive control that satisfies (B) and does not satisfy (A) described above. In FIG. 10, group G1 is composed of panels A1, A2, and A3. Group G2 is composed of panels B1, B2, and B3. Group G3 is composed of panels C1, C2, and C3. Each of the panels executes the transmission function exclusively of a vertically adjacent panel, and executes the transmission function simultaneously with a horizontally adjacent panel. In other words, aforementioned (B) is satisfied.

The exclusive control in FIG. 10 is suitable for the landscape shooting illustrated in FIG. 6. In this case, for example, an icon or a sentence introducing "landscape shooting" may be displayed in at least one of invitation displays 1a to 1e illustrated in FIG. 2. By doing so, portable device 5 can, with respect to signboard apparatus 1 in which the exclusive control in FIG. 10 is executed, reduce misrecognition when receiving visible light communication, and reduce deterioration of reading speed, that is, information recognition speed at the portable device-side.

It should be noted that, in FIG. 10, groups G1 and G3 may be set as one new group, and the two groups, the new group and group G2, may alternately transition to the modulation interval.

Furthermore, light apparatus 2 is not limited to the internally illuminated type, and may be of the externally illuminated type.

Embodiment 2

A signboard apparatus and a signboard system according to Embodiment 2 are described below.

Figure 11:
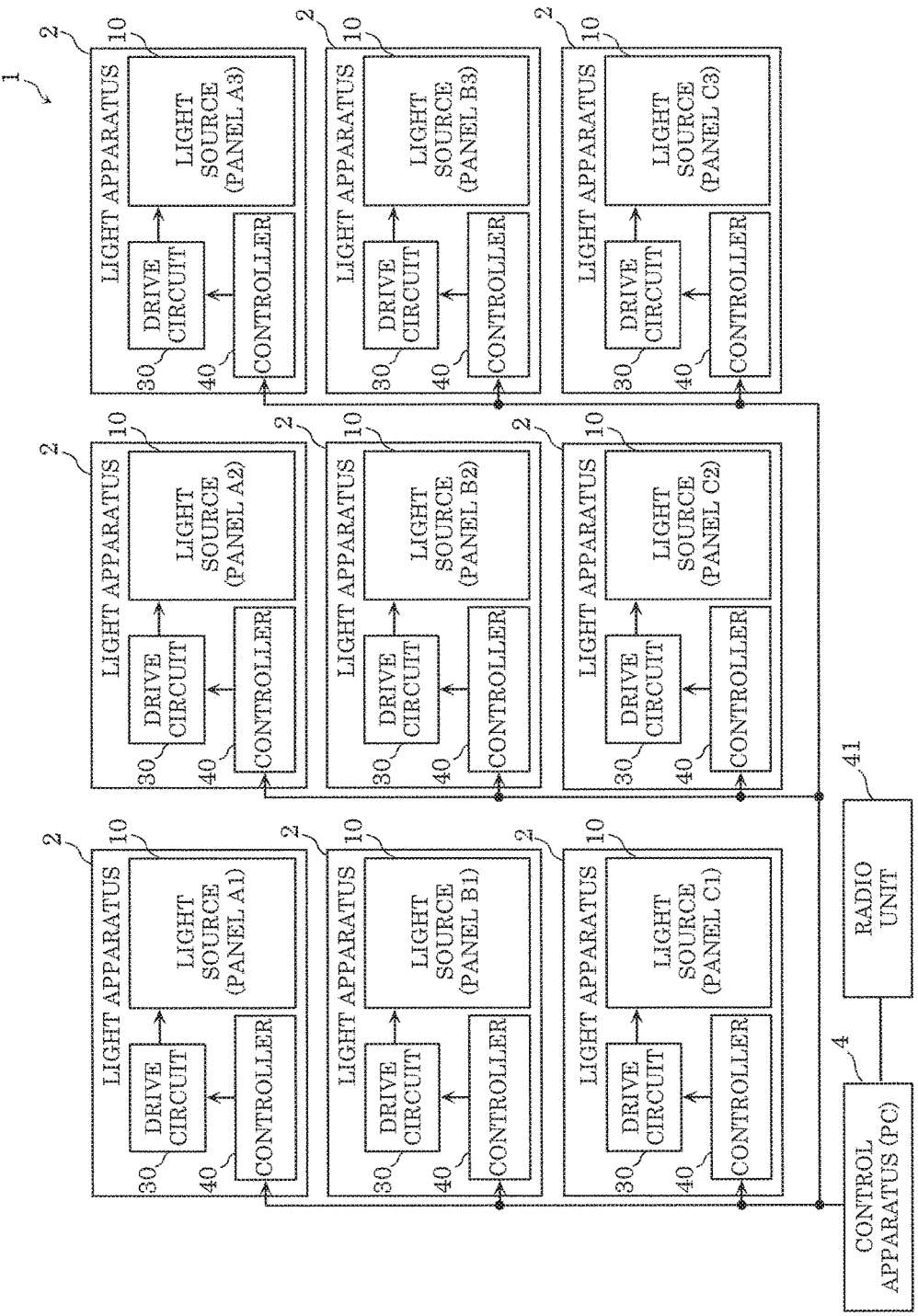
FIG. 11 is a block diagram illustrating an example configuration of a signboard apparatus according to Embodiment 2.

FIG. 11 is a block diagram illustrating an example configuration of signboard apparatus 1 according to Embodiment 2. Compared to FIG. 1, signboard apparatus 1 in FIG. 11 is different in terms having radio unit 41 added, and having a faster operating mode as a transmission function for visible light communication. Hereinafter, description is carried out focusing on the points of difference.

Radio unit 41 performs radio communication with portable device 5 using a wireless LAN (Local Area Network).

Each of light apparatuses 2 has a first mode for executing the visible light communication according to Embodiment 1, and a second mode for executing visible light communication which is faster than the visible light communication of the first mode. The bit rate of the first mode is several kbps (for example, 4.8 kbps), whereas the bit rate of the second mode is several Mbps. The amount of information that can be transmitted using the second mode is at least several hundred times that of the first mode. In other words, in the second mode, it is possible to provide more detailed information faster to the user of portable device 5. Each of light apparatuses 2, upon receiving a mode switching command from control apparatus 4, temporarily transitions from the first mode to the second mode.

Figure 12A:
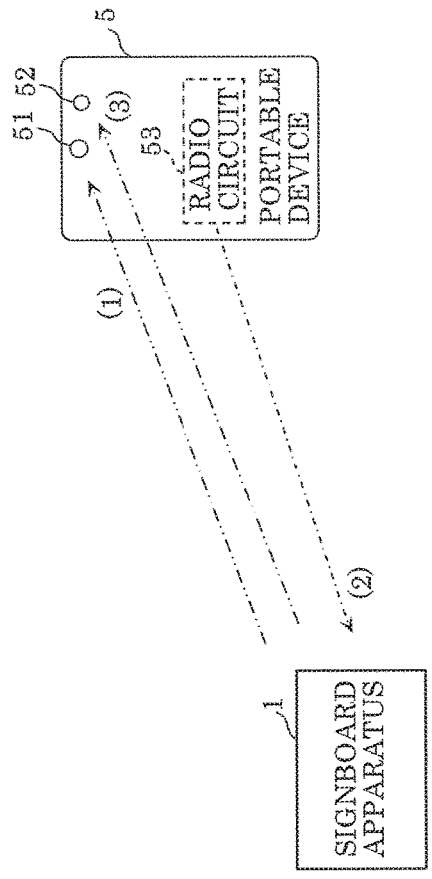
FIG. 12A is an explanatory diagram illustrating communication between the signboard apparatus and a portable device according to Embodiment 2.

FIG. 12A is an explanatory diagram illustrating communication between signboard apparatus 1 and portable device 5 according to Embodiment 2. Portable device 5 in the figure includes camera 51, photosensor 52, and radio circuit 53.

Camera 51 receives first mode visible light communication signals, as illustrated by two-dot chain line (1) in the figure. Details have already been described using FIG. 5.

Photosensor 52 is for example a photodiode, and receives second mode visible light communication signals, as illustrated by two-dot chain line (3) in FIG. 12A.

Radio circuit 53 transmits, to signboard apparatus 1, a switching request including light apparatus 2 identification information, according to a user operation. For example, when the user taps a "detailed information" icon on the reproduction screen for received data of first mode visible light communication (1), radio circuit 53 transmits, to signboard apparatus 1, a switching request including light apparatus 2 identification information.

Figure 12B:
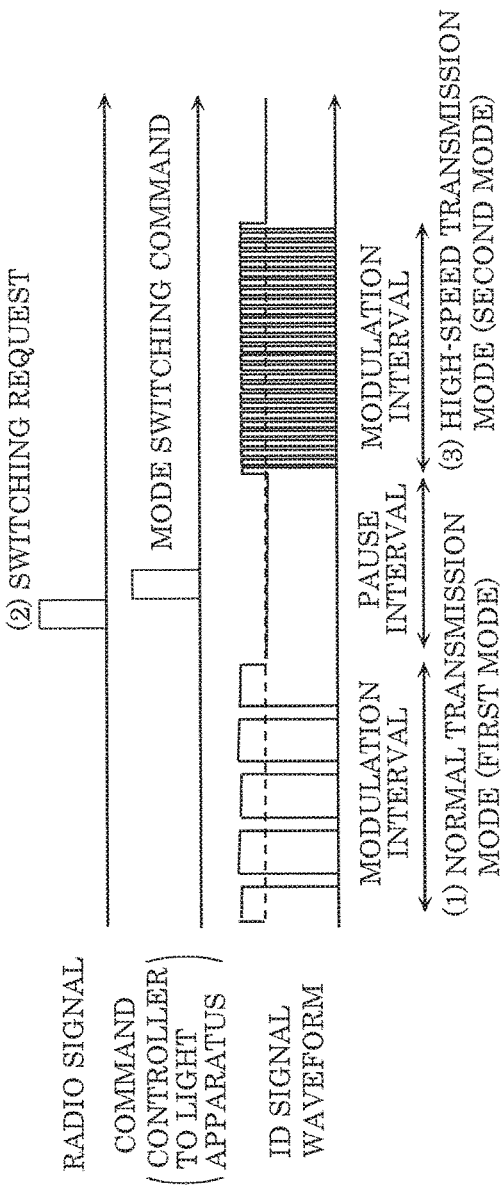
FIG. 12B is a time chart illustrating an example of mode transition in the signboard apparatus according to Embodiment 2.

FIG. 12B is a time chart illustrating an example of mode transition in signboard apparatus 1 according to Embodiment 2.

Portable device 5 transmits, to signboard apparatus 1, a switching request including light apparatus 2 identification information. When the switching request including light apparatus 2 identification information is received by radio circuit 41, control apparatus 4 transmits a mode switching command to light apparatus 2 corresponding to the identification information. When signboard apparatus 1 receives the mode switching command, signboard apparatus 1 transitions from the first mode to the second mode. FIG. 12B illustrates an example of receiving a mode switching command in a pause interval, and transitioning to the second mode from the next modulation interval by signboard apparatus 1. When signboard apparatus 1 receives the mode switching command in a modulation interval, signboard apparatus 1 immediately transitions from the first mode to the second mode.

Figure 13:
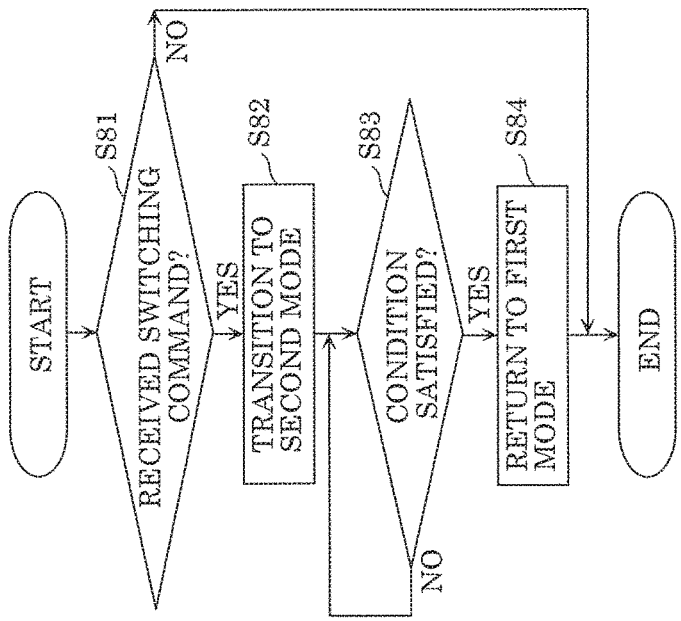
FIG. 13 is a flowchart illustrating an example process of the light apparatus according to Embodiment 2.

FIG. 13 is a flowchart illustrating an example process of light apparatus 2 according to Embodiment 2. In the figure, when light apparatus 2 receives a mode switching command (YES in S81), light apparatus 2 transitions from the first mode to the second mode (S82), and, in addition, determines whether a condition is satisfied (S83). This condition is, for example, the elapse of a fixed time, or the completion of transmission of a series of contents in the second mode, since the transition from the first mode to the second mode.

When the condition is satisfied, light apparatus 2 returns from the second mode to the first mode (S84)

As described above, signboard apparatus 1 according to this embodiment can convey an invitation to receive visible light communication, and rapidly provide more-detailed information, to the user of portable device 5. Since signboard apparatus 1 switches from the first mode to the second mode according to the node switching request from portable device 5, signboard apparatus 1 is capable of providing more-detailed information to the user who is interested in a particular light apparatus 2. Furthermore, since the high-speed second mode is executed only when required, information can be provided to the user of portable device 5 efficiently and in a short time. In addition, since receiving using photosensor 52 consumes less power than receiving using camera 51, switching from the first mode to the second mode allows the power consumption of portable device 5 to be reduced.

Modifications

Figure 14:
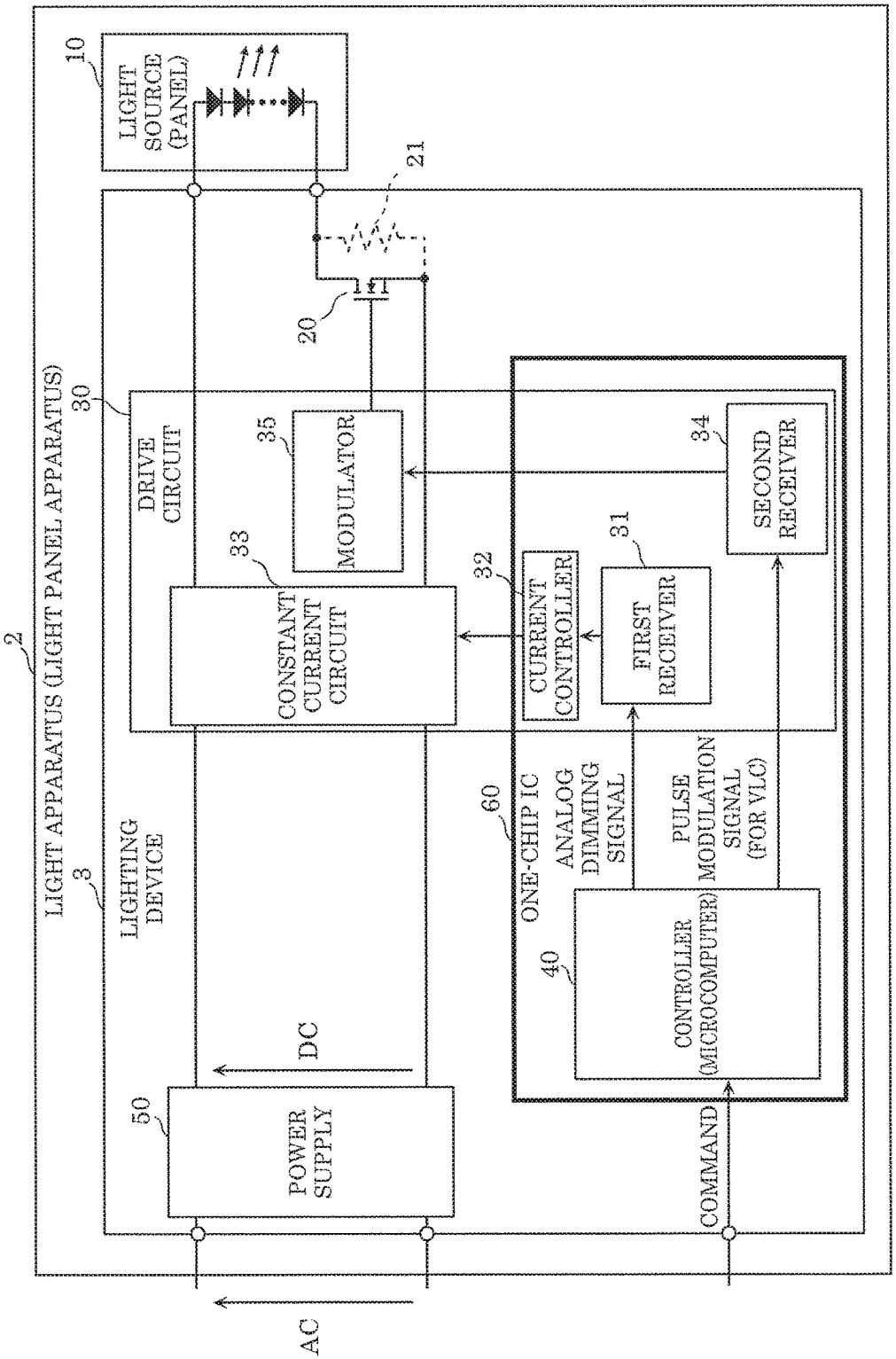
FIG. 14 is a block diagram illustrating a modification of the light apparatus according to Embodiment 1 or Embodiment 2.

FIG. 14 is a block diagram illustrating a modification of light apparatus 2 according to Embodiment 1 or Embodiment 2. Compared to FIG. 6, light apparatus 2 in the figure is different in that controller 40, first receiver 31, current controller 32, and second receiver 34 are integrated into one-chip IC 60. Hereinafter, description is carried out focusing on the points of difference.

In FIG. 14, the analog dimming signals for controlling the constant current of constant current circuit 33 and the pulse modulation signals for controlling modulator 35 are generated in controller 40 (microcomputer). As such, in FIG. 6, the circuits corresponding to one-chip IC 60 are broadly divided into two, an analog circuit that includes an analog oscillator, and a circuit (microcomputer) that stores transmission data including identification information, and outputs analog dimming signals and pulse modulation signals. As such, cost is high. In order to reduce cost, in FIG. 14, controller 40, first receiver 31, current controller 32, and second receiver 34 are integrated into one-chip IC 60.

In this manner, signboard apparatus 1 in FIG. 14 enables further cost reduction than signboard apparatus 1 according to Embodiment 1 and Embodiment 2.

It should be noted that although the pulse modulation in each of the foregoing embodiments uses a modulation factor of 100%, that is, a light-ON state of 100% and a light-OFF state of 0% are used, a modulation factor other than 100% may be used. Furthermore, instead of I4PPM, InPPM (where n is an integer greater than or equal to 2) may be used, or a different pulse modulation may be used.

As described above, signboard apparatus 1 according to one or more of the exemplary embodiments includes light panel apparatuses 2 arranged two-dimensionally, and each having a transmission function and a light-emitting face for visible light communication; and control apparatus 4 that performs, with respect to light panel apparatuses 2, exclusive control of the transmission function, wherein light panel apparatuses 2 are arranged as a collective signboard.

Accordingly, in the receiving of visible light communication, it is possible to reduce misrecognition and reduce deterioration of reading speed, that is, information recognition speed at the portable device-side.

Here, control apparatus 4 may cause each of light panel apparatuses 2 to execute the transmission function exclusively of another of light panel apparatuses 2 which is horizontally adjacent.

Accordingly, in the case of receiving visible light communication by portrait shooting using the camera of the portable device, for example, it is possible to reduce misrecognition and reduce deterioration of reading speed, that is, information recognition speed at the portable device-side.

Here, control apparatus 4 may cause each of light panel apparatuses 2 to execute the transmission function exclusively of another of light panel apparatuses 2 which is vertically adjacent.

Accordingly, in the case of receiving visible light communication by landscape shooting using the camera of the portable device, for example, it is possible to reduce misrecognition and reduce deterioration of reading speed, that is, information recognition speed at the portable device-side.

Here, control apparatus 4 may allow each of light panel apparatuses 2 to execute the transmission function simultaneously with another of light panel apparatuses 2 which is obliquely adjacent.

Accordingly, it is possible to increase the number of light panel apparatuses that simultaneously execute the transmission function for visible light communication.

Here, control apparatus 4 may cause each of light panel apparatuses 2 to execute the transmission function exclusively of another of light panel apparatuses 2 which is adjacent in a first direction, and allow each of light panel apparatuses 2 to execute the transmission function simultaneously with another of light panel apparatuses 2 which is adjacent in a second direction different from the first direction.

Accordingly, by matching the lengthwise direction of the portable device with the first direction or the second direction, in the case of receiving visible light communication by shooting using the camera of the portable device, it is possible to reduce misrecognition and reduce deterioration of reading speed, that is, information recognition speed at the portable device-side.

Here, signboard apparatus 1 may further include invitation display 1a disposed on a surface of a layout of light panel apparatuses 2 and having an icon or a guidance message conveying an invitation to receive the visible light communication.

Accordingly, it is possible to convey an invitation to receive visible light communication, and provide more-detailed information than the signboard display, to the user of the portable device.

Here, signboard apparatus 1 may include invitation displays 1a to 1c, wherein invitation displays 1a to 1c are disposed between light panel apparatuses 2, at approximately equal intervals.

Accordingly, it is possible to more reliably convey an invitation to receive visible light communication to the user of the portable device.

Here, each of light panel apparatuses 2 may have a first mode for executing visible light communication and a second mode for executing visible light communication which is faster than the visible light communication of the first mode, and transitions from the first mode to the second mode upon receiving a mode switching command.

Accordingly, it is possible to convey an invitation to receive visible light communication, and rapidly provide more-detailed information, to the user of the portable device.

Here, control apparatus 4 may include radio unit 41, and, when radio unit 41 receives a mode switching request including light panel apparatus 2 identification information, may transmit the mode switching command to one of light panel apparatuses 2 which corresponds to the identification information.

Accordingly, by switching from the first mode to the second mode according to the mode switching request from the portable device, it is possible to provide more-detailed information to the user who is interested in a particular light panel apparatus. Furthermore, since the high-speed second mode is executed only when required, information can be provided to the user of the portable device efficiently and in a short time.

Here, each of light panel apparatuses 2 may return to the first mode after a fixed time has elapsed, or after a series of contents is transmitted, since transitioning to the second mode.

Accordingly, since the high-speed second mode is executed only when required, information can be provided to the user of the portable device efficiently.

Here, each of light panel apparatuses 2 may include light-emitting diodes (LEDs) as light sources emitting light through the light-emitting face.

Accordingly, a light source capable of high-speed blinking which is suitable for visible light communication can be realized at a low cost.

Furthermore, a signboard system according to one or more of the exemplary embodiments includes signboard apparatus 1, portable device 5 that receives a signal for visible light communication from signboard apparatus 1, wherein portable device 5 includes camera 51 that receives the signal for visible light communication.

Accordingly, in the case of receiving visible light communication by portrait shooting using the camera of the portable device, for example, it is possible to reduce misrecognition and reduce deterioration of reading speed, that is, information recognition speed at the portable device-side.

Here, signboard apparatus 1 may be signboard apparatus 1 that transitions from the first mode to the second mode upon receiving a mode switching command, portable device 5 may further include photosensor 52, camera 51 may receive a signal for the visible light, communication of the first mode, and photosensor 52 may receive a signal for the visible light communication of the second mode.

Accordingly, by receiving visible light communication in the second mode, information can be received in a shorter time and more efficiently than in the second mode.

Here, portable device 5 may further include radio circuit 53, radio circuit 53 may transmit a mode switching request including light panel apparatus 2 identification information to signboard apparatus 1, and control apparatus 4 may include radio unit 41, and when radio unit 41 receives the mode switching request, may transmit the mode switching command to one of light panel apparatuses 2 which corresponds to the identification information.

Accordingly, since the high-speed second mode is executed only when required, information can be provided to the user of the portable device efficiently. Furthermore, a typical smartphone can be used as the portable device.

Although the signboard apparatus according to the present disclosure has been described based on exemplary embodiments, the present disclosure is not limited to these embodiments. Forms obtained by various modifications to the exemplary embodiments that can be conceived by a person of skill in the art as well as other forms realized by combining part of the structural components in the exemplary embodiments and modifications, which are within the scope of the essence of the present disclosure are included in the present disclosure.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A signboard apparatus comprising:
a plurality of light panel apparatuses arranged two-dimensionally, and each having a transmission function and a light-emitting face for visible light communication;
a control apparatus that performs, with respect to two light panel apparatuses that are adjacent among the plurality of light panel apparatuses, exclusive control of the transmission function, the exclusive control being control for causing one of the two light panel apparatuses to transmit an optical signal for the visible light communication, and causing the other of the two light panel apparatuses not to transmit any optical signal for the visible light communication by remaining lighted;
an invitation display capable of displaying text messages and disposed on a surface of a layout of the plurality of light panel apparatuses and having an icon or a guidance message conveying an invitation to receive the visible light communication; and
a plurality of the invitation displays, wherein the plurality of the invitation displays are disposed between the plurality of light panel apparatuses, at approximately equal intervals,
wherein the plurality of light panel apparatuses are arranged as a collective signboard.

2. The signboard apparatus according to claim 1, wherein the control apparatus causes each of the plurality of light panel apparatuses to execute the transmission function exclusively of another of the plurality of light panel apparatuses which is horizontally adjacent.

3. The signboard apparatus according to claim 1, wherein the control apparatus causes each of the plurality of light panel apparatuses to execute the transmission function exclusively of another of the plurality of light panel apparatuses which is vertically adjacent.

4. The signboard apparatus according to claim 1, wherein the control apparatus allows each of the plurality of light panel apparatuses to execute the transmission function simultaneously with another of the plurality of light panel apparatuses which is obliquely adjacent.

5. The signboard apparatus according to claim 1, wherein the control apparatus causes each of the plurality of light panel apparatuses to execute the transmission function exclusively of another of the plurality of light panel apparatuses which is adjacent in a first direction, and allows each of the plurality of light panel apparatuses to execute the transmission function simultaneously with another of the plurality of light panel apparatuses which is adjacent in a second direction different from the first direction.

6. The signboard apparatus according to claim 1, wherein each of the plurality of light panel apparatuses has a first mode for executing visible light communication and a second mode for executing visible light communication which is faster than the visible light communication of the first mode, and transitions from the first mode to the second mode upon receiving a mode switching command.

7. The signboard apparatus according to claim 6, wherein the control apparatus includes a radio unit, and, when the radio unit receives a mode switching request including identification information of a light panel apparatus, transmits the mode switching command to one of the plurality of light panel apparatuses which corresponds to the identification information.

8. The signboard apparatus according to claim 6, wherein each of the plurality of light panel apparatuses returns to the first mode after a fixed time has elapsed, or after a series of contents is transmitted, since transitioning to the second mode.

9. The signboard apparatus according to claim 1, wherein each of the plurality of light panel apparatuses includes a plurality of light-emitting diodes (LEDs) as light sources emitting light through the light-emitting face.

10. A signboard system comprising:
the signboard apparatus according to claim 1; and
a portable device that receives a signal for visible light communication from the signboard apparatus,
wherein the portable device includes a camera that receives the signal for visible light communication.

11. A signboard system comprising:
the signboard apparatus according to claim 6; and
a portable device that receives a signal for visible light communication from the signboard apparatus,
wherein the portable device further includes a camera and a photosensor,
the camera receives a signal for the visible light communication of the first mode, and
the photosensor receives a signal for the visible light communication of the second mode.

12. The signboard system according to claim 11, wherein the portable device further includes a radio circuit, the radio circuit transmits a mode switching request including identification information of a light panel apparatus, to the signboard apparatus, and
the control apparatus includes a radio unit, and, when the radio unit receives the mode switching request, transmits the mode switching command to one of the plurality of light panel apparatuses which corresponds to the identification information.

13. The signboard apparatus according to claim 1, the exclusive control being control for causing the one of the two light panel apparatuses to transmit an optical signal for the visible light communication by modulating light, and causing the other of the two light panel apparatuses not to transmit any optical signal for the visible light communication by remaining lighted.

14. The signboard apparatus according to claim 1, the exclusive control being control for causing the one of the two light panel apparatuses to transmit an optical signal for the visible light communication by modulating light during a time period, and causing the other of the two light panel apparatuses not to transmit any optical signal for the visible light communication by remaining lighted during the time period.

15. The signboard apparatus according to claim 1, the exclusive control being control for
causing the one of the two light panel apparatuses to transmit an optical signal for the visible light communication by modulating light during a first time period, and causing the other of the two light panel apparatuses not to transmit any optical signal for the visible light communication by remaining lighted during the first time period, and
causing the one of the two light panel apparatuses not to transmit any optical signal for the visible light communication by remaining lighted during a second time period, and causing the other of the two light panel apparatuses to transmit an optical signal for the visible light communication by modulating light during the second time period.

\* \* \* \* \*